April 5, 1949.  H. R. CARVER  2,466,152
LAMINATED SPRING FOR VEHICLES
Filed Dec. 19, 1944  2 Sheets-Sheet 1

Inventor
Henry Richard Carver

April 5, 1949. H. R. CARVER 2,466,152
LAMINATED SPRING FOR VEHICLES
Filed Dec. 19, 1944 2 Sheets-Sheet 2

Inventor
Henry Richard Carver
by Michael S. Ash
his agent

Patented Apr. 5, 1949

2,466,152

UNITED STATES PATENT OFFICE 2,466,152

LAMINATED SPRING FOR VEHICLES

Henry Richard Carver, Thackley, Bradford, England, assignor to Jonas Woodhead & Sons Limited, Leeds, England Application December 19, 1944, Serial No. 568,819
In Great Britain February 23, 1944

2 Claims. (Cl. 267—54)

1

This invention relates to laminated springs for vehicles and more particularly to the kind in which for the purpose of eliminating or reducing the twisting or torsional stresses to which such springs are normally subject when in service, the ends of the spring are mounted so as to permit of relative movement about a longitudinal axis between the springs and their fixed supporting pins so that the spring as a whole is free to follow the movement of the axle when one side of the vehicle passes over inequalities in the road surface.

The present invention is concerned more specifically with springs of the kind herein referred to which are mounted at their ends so as to be free to turn about a fore and aft axis on trunnions carried by blocks which are pivotally mounted on the supporting pins fixed to the vehicle chassis.

I am aware that in springs mounted in this way and having rolled eyes, it has already been proposed to fill the eye with a solid metal plug and to bore a hole through said eye and plug at right angles to the axis thereof to provide a bearing for the trunnion which is further supported by means of a crush washer arranged between the eye and a nut on the end of the trunnion.

The object of the present invention is to provide an improved construction and to give additional support for the trunnion fitment.

In the accompanying drawings.

Figure 1:
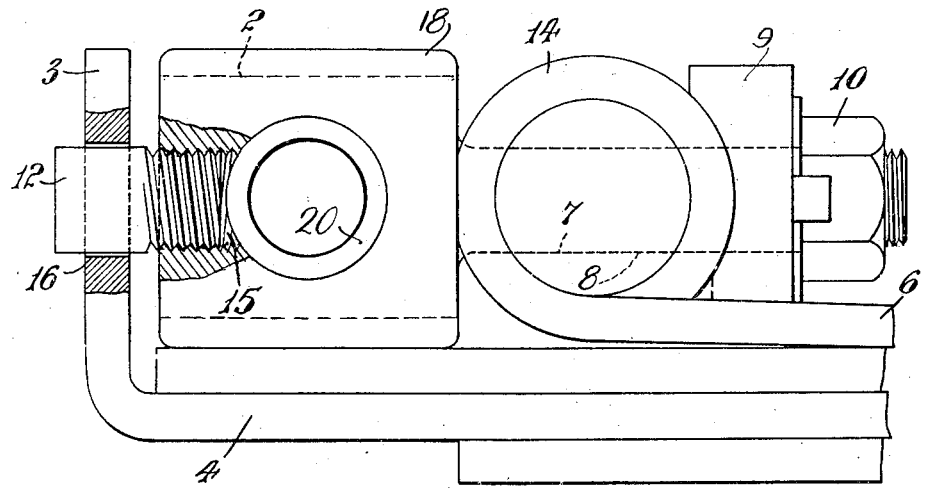
Figure 1 is a view of a laminated spring mounting according to the present invention.
Figure 2:
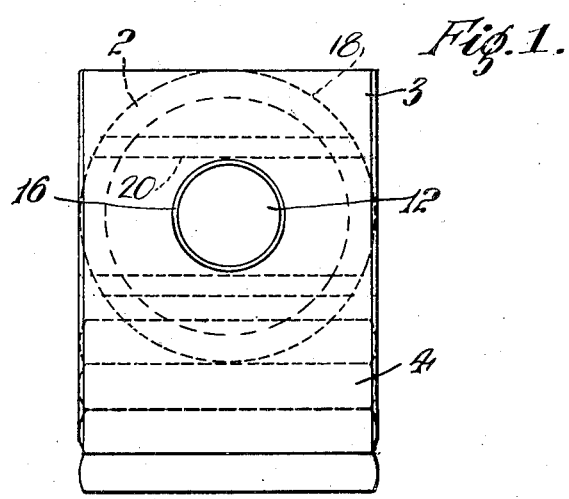
Figures 2 and 3 are end and plan views thereof respectively.
Figure 3:
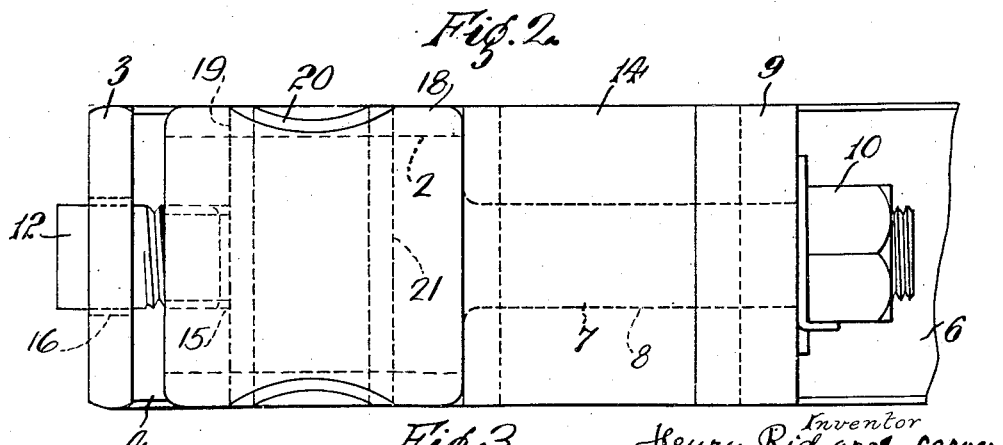

Referring to Figures 1, 2 and 3 the trunnion block 2 is arranged between the upturned end 3 of the third plate 4 of the spring and a plugged rolled eye 14 at the end of the back plate 6. The trunnion 7 itself passes through a hole 8 bored through the plugged rolled eye at right angles to the axis thereof. The said trunnion 7 is secured by means of a nut 10 on its screw-threaded free end bearing against a facing formed for the purpose on crush washer 9 disposed between the nut 10 and the plugged rolled eye 14.

With the object of providing additional support for the trunnion fitment the outer end of the block 2 is formed or provided with a tailpiece 12. Said tail piece 12 is made as a separate part and screwed into a tapped hole 15 in the block through a hole 16 in the upturned end 3 of the third plate 4.

2

Figure 4:
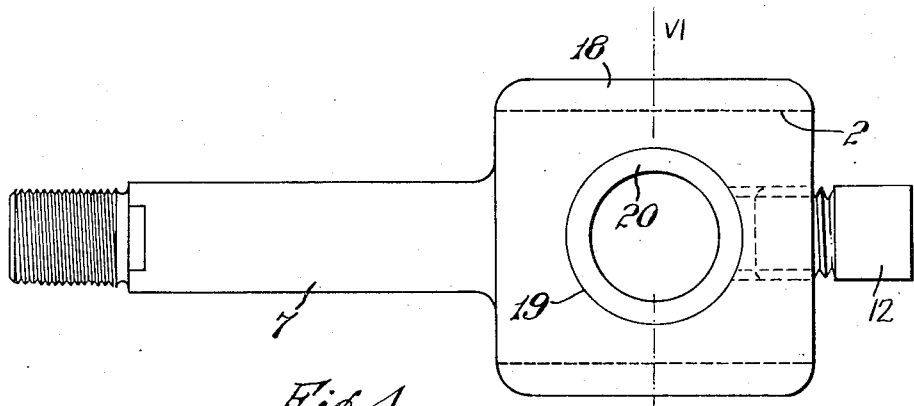
Figures 4 and 5 are side and plan views respectively of the trunnion fitment per se.
Figure 5:
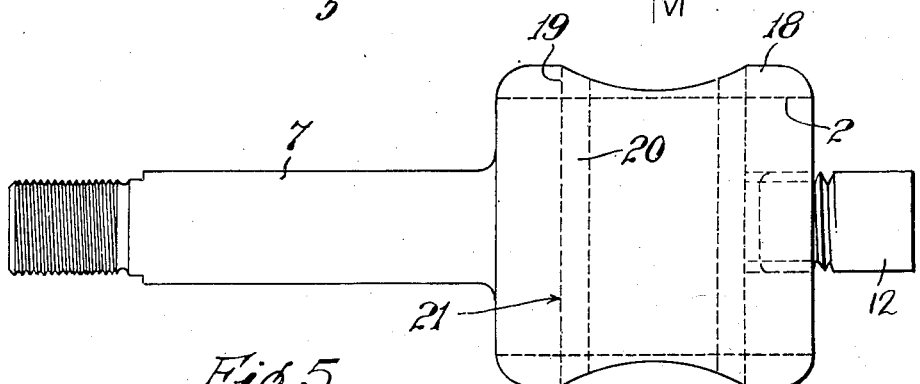
Figure 6:
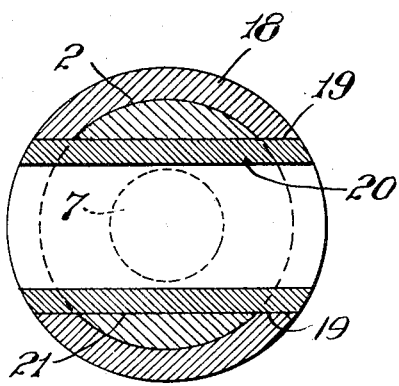
Figure 6 is a cross-sectional view thereof on the line VI—VI of Figure 4.

In the manufacture of trunnion fitments of the kind herein referred to some difficulty is experienced in maintaining parallelism in the bore of that part of the trunnion which receives the bush for the shackle pin. This is due to the present necessity for case-hardening both the trunnion and the bush so that when the latter is forced into the hole in the former there is a tendency for the bush to collapse to some extent and, owing to the mass of metal of the trunnion being uneven the bush also has a tendency to become somewhat oval. In order to obviate this difficulty it is now proposed according to this invention, and as shown in Figures 4, 5 and 6, to make the trunnion block 2 together with the trunnion 7 of mild steel and to reduce the diameter of the block and to fit it with a case hardened tube 18 which is shrunk onto the trunnion block during the process of hardening the said tube. The hole 19 for the bush 20 in the tube is made very slightly larger than the outside diameter of the bush and is drilled in the tube before the latter is shrunk onto the trunnion block 2, after which the hole 21 for the bush in the latter is drilled and reamered. When, therefore, the bush is pressed into the hole in the trunnion block no distortion of the bush takes place, the hole 19 in the case-hardened tube 18 being large and the trunnion block soft. Since the trunnion block itself is not carburized there is no danger of any part of the trunnion 7 being hardened as is the case at present.

I claim:

1. An improved mounting for an end of a laminated spring comprising in combination a rolled eye to said end of the spring main plate; a plug to said eye; a soft metal block; a hole through said eye having an axis longitudinal of said spring; a trunnion to said block mounted for rotation in said hole; an external case hardened tube shrunk on said soft metal block; a bush extending transversely through said block and tube, said bush journalling on a transverse pin carried by the vehicle; a tail piece carried by the end of said block remote from said trunnion; an upturned extension of one of the other plates of said spring, said upturned extension having a hole therein to receive the free end of said tail piece; a crush washer mounted on said trunnion so as to abut the side of said plugged rolled eye remote from said block and to bear upon said main plate; and a securing nut screwing onto the free end of said trunnion to abut said crush washer.

2. An improved mounting for an end of a laminated spring comprising in combination a rolled eye to said end of the spring main plate; a plug to said eye; a mild steel block; a hole through said eye having an axis longitudinal of said spring; a trunnion to said block mounted for rotation in said hole; an external case hardened tube shrunk on said mild steel block; a bush extending transversely through said block and tube, said bush journalling on a transverse pin carried by the vehicle; a separate tail piece screwing into the end of said block remote from said trunnion; an upturned extension of the end of the third plate of said spring, said upturned extension having a hole therein to receive the free end of said tail piece; a crush washer mounted on said trunnion so as to abut the side of said plugged rolled eye remote from said block and bear upon said main plate; and a securing nut screwing into the free end of said trunnion to abut said crush washer.

HENRY RICHARD CARVER.

REFERENCES CITED

The following references are of record in the file of this patent:

FOREIGN PATENTS

| Number | Country | Date |
| --- | --- | --- |
| 508,139 | France | July 16, 1920 |
| 602,423 | France | Dec. 23, 1925 |
| 314,689 | Great Britain | July 4, 1929 |
| 534,959 | Germany | Oct. 3, 1931 |
| 540,194 | Great Britain | Oct. 8, 1941 |